United States Patent
Lam et al.

(10) Patent No.: US 8,484,721 B2
(45) Date of Patent: Jul. 9, 2013

(54) LOCKED-DOWN COMPUTING ENVIRONMENT

(75) Inventors: Monica Sin-Ling Lam, Menlo Park, CA (US); Constantine P. Sapuntzakis, Mountain View, CA (US)

(73) Assignee: Moka5, Inc., Redwood City, CA (US)

( * ) Notice: Subject to any disclaimer, the term of this patent is extended or adjusted under 35 U.S.C. 154(b) by 796 days.

(21) Appl. No.: 12/534,699

(22) Filed: Aug. 3, 2009

(65) Prior Publication Data

US 2010/0031348 A1 Feb. 4, 2010

Related U.S. Application Data

(60) Provisional application No. 61/086,110, filed on Aug. 4, 2008.

(51) Int. Cl.
*H04L 9/32* (2006.01)
*G06F 12/00* (2006.01)

(52) U.S. Cl.
USPC .................... 726/19; 726/16; 711/115; 713/2

(58) Field of Classification Search
USPC ............................ 726/16, 19; 711/115; 713/2
See application file for complete search history.

(56) References Cited

U.S. PATENT DOCUMENTS

| | | | | |
|---|---|---|---|---|
| 5,960,172 | A * | 9/1999 | Hwang | 726/34 |
| 6,275,938 | B1 * | 8/2001 | Bond et al. | 726/23 |
| 6,678,712 | B1 * | 1/2004 | McLaren et al. | 718/100 |
| 7,032,053 | B2 * | 4/2006 | Himmel et al. | 710/302 |
| 7,111,172 | B1 * | 9/2006 | Duane et al. | 713/182 |
| 7,587,661 | B2 * | 9/2009 | Bell et al. | 714/799 |
| 7,627,099 | B2 * | 12/2009 | Amidi | 379/112.02 |
| 7,676,432 | B2 * | 3/2010 | Ling | 705/39 |
| 7,779,243 | B2 * | 8/2010 | Adrangi et al. | 713/2 |
| 8,136,151 | B2 * | 3/2012 | Smith et al. | 726/15 |

* cited by examiner

*Primary Examiner* — Kambiz Zand
*Assistant Examiner* — Aubrey Wyszynski
(74) *Attorney, Agent, or Firm* — Park, Vaughan, Fleming & Dowler, LLP

(57) ABSTRACT

Some embodiments of the present invention provide a system that presents an alternate computing environment on a host computing device. During operation, this system detects the presence of a removable storage device which is in communication with an interface of the host computing device. The system also locates code which implements the alternate computing environment on the removable storage device. Finally, the system runs the code which presents the alternate computing environment through an environment player on the host device, wherein the environment player prevents a user of the alternate computing environment from interacting directly with a native computing environment of the host computing device.

20 Claims, 6 Drawing Sheets

LOCKED-DOWN COMPUTING ENVIRONMENT

RELATED APPLICATION

This application hereby claims priority under 35 U.S.C. §119 to U.S. Provisional Patent Application No. 61/086,110, filed on 4 Aug. 2008, entitled "Locked-Down Computing Environment," by inventors Monica Sin-Ling Lam and Constantine P. Sapuntzakis.

TECHNICAL FIELD

The disclosed implementations are generally related to computers and operating systems.

BACKGROUND

Conventional computer systems can provide a safe and controlled computer experience by allowing administrators (e.g., parents) to create user accounts with reduced privileges for other users (e.g., user accounts for their children). For example, a parent can install software in a child's account that restricts or monitors the child's computer usage. This conventional approach has problems. Even with reduced privileges, software downloaded by a child can subvert the computer by exploiting weaknesses in the operating system. Also, it is tedious to manually set up and configure multiple user accounts for multiple children on each home computer, and to configure child safety software for each of those user accounts.

SUMMARY

When a removable storage device is coupled to a host device, the host device hides a host environment (e.g., a native operating system) and presents an alternate computing environment (e.g., programs, settings, data) which is stored on the removable storage device. In some embodiments, the alternate computing environment includes a guest operating system (OS). In some embodiments, applications and other components of the alternate computing environment are loaded using virtualization software.

In some implementations, when the alternate computing environment is shut down (e.g., explicitly through a user interface, removing the removable device), the host device reverts back to presenting the host environment. In some implementations, a user of the alternate computing environment cannot enter or escape to the host environment without knowing the password of the host environment, or being subjected to other security procedures.

The disclosed implementations can be used in applications where the host device should switch immediately to an alternate computing environment, and not allow access to underlying host environment or software applications running in the host environment. For example, the disclosed implementations could be used with computer kiosks at airports that allow users to use their personal, alternate computing environments. Or, a person may want to lend the use of a computer to a visiting friend or family member, and not risk having their host environment corrupted or infected with a virus. In some implementations, to secure the integrity of the host environment, the alternate computing environment can be run from a "sandbox," so that the alternate computing environment cannot corrupt the host environment.

More specifically, some embodiments of the present invention provide a system that runs an alternate computing environment on a host computing device. During operation, this system detects the presence of a removable storage device which is attached to (or in communication with) an interface of the host computing device. The system also locates code which implements the alternate computing environment on the removable storage device. Finally, the system runs the code which implements the alternate computing environment on an environment player on the host device, wherein the environment player prevents a user of the alternate computing environment from interacting directly with a native computing environment of the host computing device.

In some embodiments, preventing the user of the alternate computing environment from interacting directly with the native computing environment can involve: (1) preventing the user from accessing most applications in the native computing environment; (2) preventing the user from accessing files in the native computing environment; and (3) preventing the user from accessing another user's account in the native computing environment.

In some embodiments, detecting the presence of the removable storage device involves detecting insertion of the removable storage device into the interface during operation of the host computing device. It may also involve detecting the presence of the removable storage device at the interface during a boot sequence for the host computing device.

In some embodiments, the system automatically terminates the alternate computing environment upon detecting an attempt by the user to execute an unauthorized function through the alternate computing environment.

In some embodiments, running the alternate computing environment involves performing a keyboard and pointing-device lock-in operation, which prevents the user of the alternate computing environment from interacting with other applications and features which are present on the host computing device.

In some embodiments, the system allows the user to interact directly with the native computing environment after the user provides a username and password or some other form of authentication.

In some embodiments, if the removable storage device is associated with an existing account on the host computing device, running the alternate computing environment involves logging in to the existing account.

In some embodiments, prior to detecting the presence of the removable storage device, the system has the environment player installed on the host computing device.

In some embodiments, the environment player on the host computing device is implemented as a virtual machine.

In some embodiments, the system includes a system manager component, which allows the system to operate when the host computing device is in a locked state, wherein during the locked state the host computing device is waiting for a user to log in.

Other implementations are disclosed that are directed to associated devices, systems, methods, computer-readable mediums and user interfaces.

DETAILED DESCRIPTION

Figure 1:
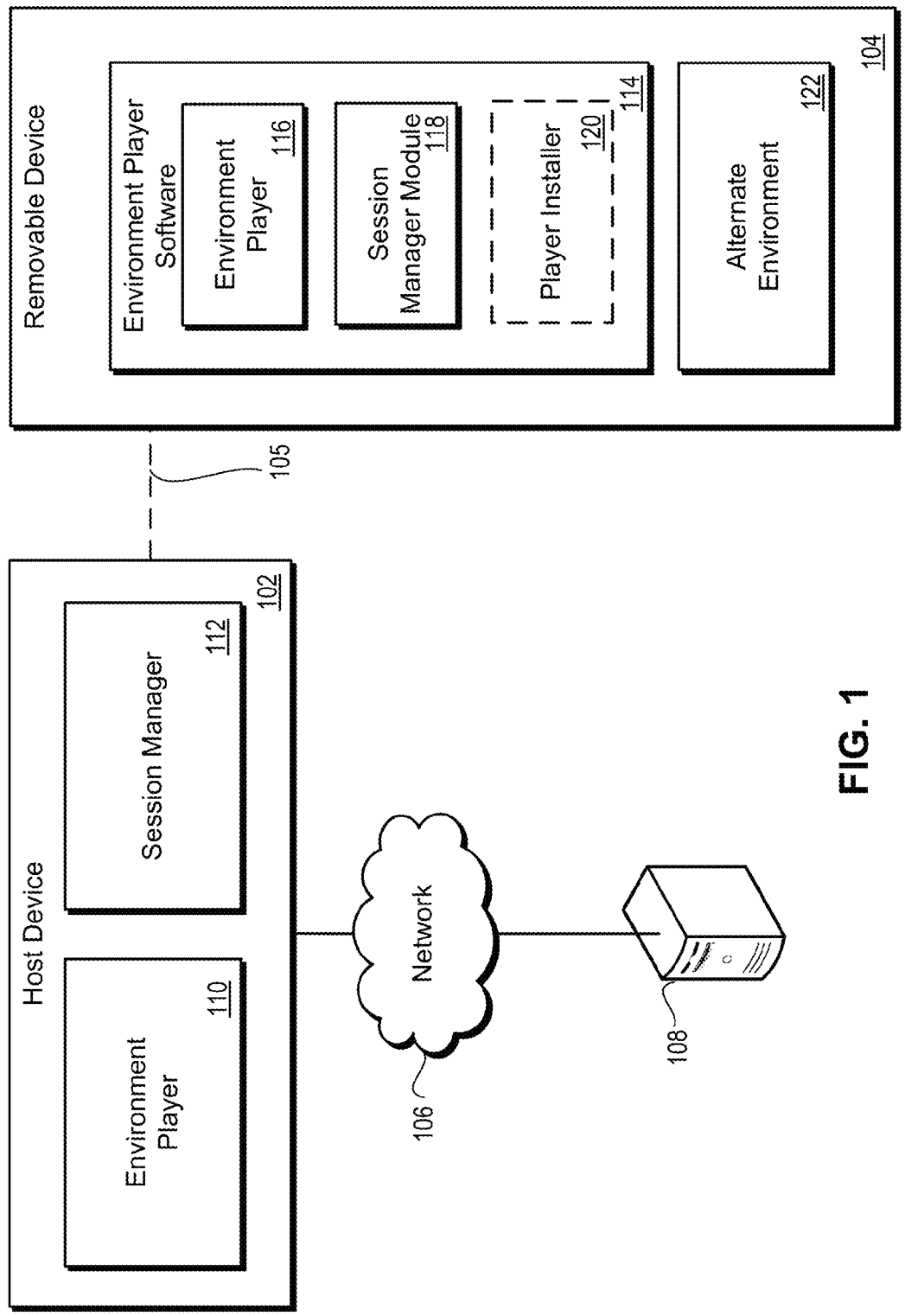
FIG. 1 is a block diagram showing an example of a system for loading a secure alternate computing environment onto a target device.

FIG. 1 is a block diagram showing an example of a system for loading an alternate computing environment onto a host device 102. In some implementations, the system 100 includes the host device 102 and one or more network resources 108, which can communicate through one or more networks 106. In some embodiments, the alternate computing environment includes a guest Os.

In some implementations, the alternate computing environment can be loaded onto host device 102 using a removable device 104, such as a portable storage device (e.g., USB flash drives, external drives), memory (e.g., RAM, ROM, flash memory), hard disks, physical media (e.g., CD ROM, DVD), optical disks, cache memory, or other storage devices. For example, a user can connect the removable device 104 to the host device 102 using link 105 (e.g., a USB port, FireWire™ port). Upon connecting to the host device 102, the alternate computing environment can be installed from the removable device 104 using link 105. In some implementations, the alternate computing environment can be loaded over one or more networks 106, or other available connections. For example, the files of the environment could be combined into a single package, e.g., using zip or some other standard packaging format, and placed on a web server where the environment player can retrieve it using HTTP GET queries. Any protocol for transferring one or more files over the network could be used in lieu of HTTP, e.g., FTP, NFS, CIFS, AFS. In some embodiments, applications and other components of the alternate computing environment are loaded using virtualization software.

The environment need not be packaged in a single file, but could be spread across multiple files, though usually there will be some convention. For example, all the files in a subdirectory can constitute an environment, or all the files pointed to by one or more description files, as well as all the files pointed to by those files, can constitute the environment. Some environment players can start after only fetching part of the environment, e.g., by only fetching some files or by fetching parts of files using HTTP range requests.

The functions mentioned above can be implemented as part of the environment player or in modules that get statically or dynamically linked with the environment player, or in software that is in a software stack used by the environment player. Once loaded, the alternate computing environment can provide users with a secure controlled computer experience.

The host device 102 can be any device capable of running an environment player, including but not limited to: personal computers, mobile phones, set-top boxes, game consoles, personal digital assistants (PDAs), consumer electronic devices, storage devices, portable storage devices, media players/recorders, embedded devices, navigation systems, email devices, etc.

The network 106 can include two or more devices (e.g., servers, computers, routers, hubs, switches, databases, etc.) that are coupled together in any configuration or topology, for communicating or sharing resources. Examples of network 106, include but are not limited to: the Internet, intranets, Ethernets, wireless networks, peer-to-peer networks, grid computing infrastructures, etc.

The network resources 108 can be any device with network connectivity, including but not limited to: server computers, routers, hubs, target devices, external storage devices, CD ROMs, etc. The network resources 108 can be coupled to one or more storage devices (e.g., hard disks, optical disks, storage area network (SAN)).

In some implementations, the host device 102 runs an environment player 110 for playing an alternate computing environment. In some implementations, the environment player 110 can be a LivePC™ Engine and the alternate computing environments can be LivePCs™, both of which are developed and distributed by Moka5, Inc. (Redwood City, Calif.). The environment player 110 can be a VMware Player and the alternate computing environment a VMware virtual machine, both of which are developed and distributed by VMware, Inc. (Palo Alto, Calif.). The environment player 110 can be an OS-level virtualization environment, like Mojopac, developed by RingCube Technologies Inc. (Santa Clara, Calif.), and the environment an OS-level virtualization entity, which is sometimes called a capsule.

Host device 102 may also include a session manager 112. In general, the session manager 112 can monitor the host device 102 for insertion of removable device 104. For example, session manager 112 can run as a service (e.g., Windows® service) that monitors and registers removable device notifications upon insertion. More generally, the session manager 112 can be implemented as any process that is loaded continually or as code that gets run on a device event.

In some implementations, the session manager 112 can search for a removable device 104 when host device 102 is booted. For example, the devices attached to host device 102 can be enumerated to find an alternative environment (from the removable device 104) rather than a particular host device environment. In some implementations, the session manager 112 in conjunction with isolation policies implemented by environment player 110 can prevent alternate environment users from accessing the host environment directly, including local files or certain hardware devices on host device 102. In some implementations, the alternate environment includes a set of favorites, a cache, and a specified home page that runs in the environment player, which includes a web browser.

The session manager 112 can instruct the environment player 110 to launch a particular environment, e.g., by launching the environment player 110 using standard process creation functions of the operating system and passing the path of the file representing the alternate environment as an argument. The session manager 112 can detect a compatible environment on an inserted removable device 104 by searching for a specific file (e.g., vm.autostart) in a specified directory (e.g., vm-autostart). In some implementations, the environment player 110 can be started using a dedicated host user account, so as to diminish the ability of the environment player and the environment to access the host environment. More generally, the session manager 112 can launch the environment player 110 with fewer privileges than the user running in the host device 102.

The session manager 112 may use some identifying information on the removable device 104 to identify the environment and/or user. The session manager 112 can also maintain a mapping from the identifying information to an account or environment. One implementation is a flat file containing two columns, the first being the identifying information and the second being the name of the account or path to the environment.

In some implementations, a parent or guardian configures a removable device 104 (e.g., a USB drive having a File Allocation Table (FAT) file system) to launch an account or an environment by running an application. The configured removable device 104 may be used by a child to launch an environment, e.g., a safe computing environment. Alternatively, if the identifying information maps to an account, plugging in the removable device 104 will log in the account. The identifying information could be a serial number of the removable device 104. The identifying information could also be contained in a file on a file system on the removable device 104. The identifying information could additionally be the account name or environment path and stored in a file on a file system.

In some implementations, a USB key may be optional. One alternative may include the session manager 112 presenting a screen with a button that links to a particular environment. For example, the button may be a "child button" that initiates a locked-down child's environment. In some implementations, a "browser button" may be included to initiate a locked-down browsing environment. A password may or may not be included to access alternate environments.

In some implementations, the session manager 112 is implemented as a GINA (Graphical Identification and Authentication) component (e.g., a Dynamic Link Library). A GINA DLL file can control a screen saver, automatically log users in, and intercept a virtual environment session, to name a few examples.

Referring now to removable device 104, environment player software 114 may be included to run an alternate computing environment 122 on the host device 102. In general, environment player software 114 can be run from the removable device 104 or it can be copied and/or installed and run on the host device 102. The environment player software can be downloaded to the host device 102 from a network resource, and used to play or start a virtual machine. An example of such software is LivePC™ Engine developed by Moka5, Inc. (Redwood City, Calif.).

The player software 114 can prevent a user of an alternate environment from interacting directly with the host environment, e.g. running applications or opening files. For example, the player software 114 can configure the alternate environment to not be able to access the relevant files in the host environment. With virtual machines, this is usually the default; there is no sharing unless explicit provisions are made.

The environment player software 114 may include an environment player 116, a session manager module 118, and optionally, a player installer 120. The player installer 120 can install the environment player 116 and/or the session manager 112 onto the host device 102, placing the environment player 110 and session manager 112 onto the file system of the host device 102.

The environment player software 114 can be distributed as an installable medium. The environment player 116 is capable of displaying and running the alternate environment 122. The environment player 116 can be installed on host device 102 by player installer 120. In some implementations, host device 102 includes an appropriate environment player for running alternate environments.

The optional player installer 120 may include installation files for performing an installation of one or more environment players 116 and session managers modules 118 on host device 102. The player installer 120 may perform operations during software installations that include creation or modification of shared and non-shared program files, folders/directories, registries, configuration file entries, environment variables, and links or shortcuts. The player installer 120 may also perform a manual installation, silent installation, unattended installation, self installation, etc.

The removable device 104 may contain one or more alternate environments 122. An alternate environment 122 may include a specific type of environment used to execute user specific software. For example, one alternate environment may include proprietary software preloaded on removable device 104. The user may transfer the proprietary software (e.g., a drawing or CAD package from a home computer) to the host device 102 using removable device 104 and, further, may begin using the software on host device 102. Advantageously, the software can be used on host device 102 without an entire installation of the package on host device 102 or additional licensing cost. In general, the alternate environment 122 can be run as a virtual environment on host device 102 and be disabled and/or removed when the removable device 104 is unattached.

Other components can be included in the host device 102 but are not shown, including but not limited to: processors, network interfaces, controllers, power circuitry, interface circuitry, clock circuitry, bridges, video chips, digital signal processing (DSP) chips, communication chips, detectors, sensors, etc.

Those versed in the art will realize that the functions provided by the environment player, session manager, and player installer can also be split across multiple modules or combined with each other and other modules in the system.

Loading a Virtual Environment

Figure 2:
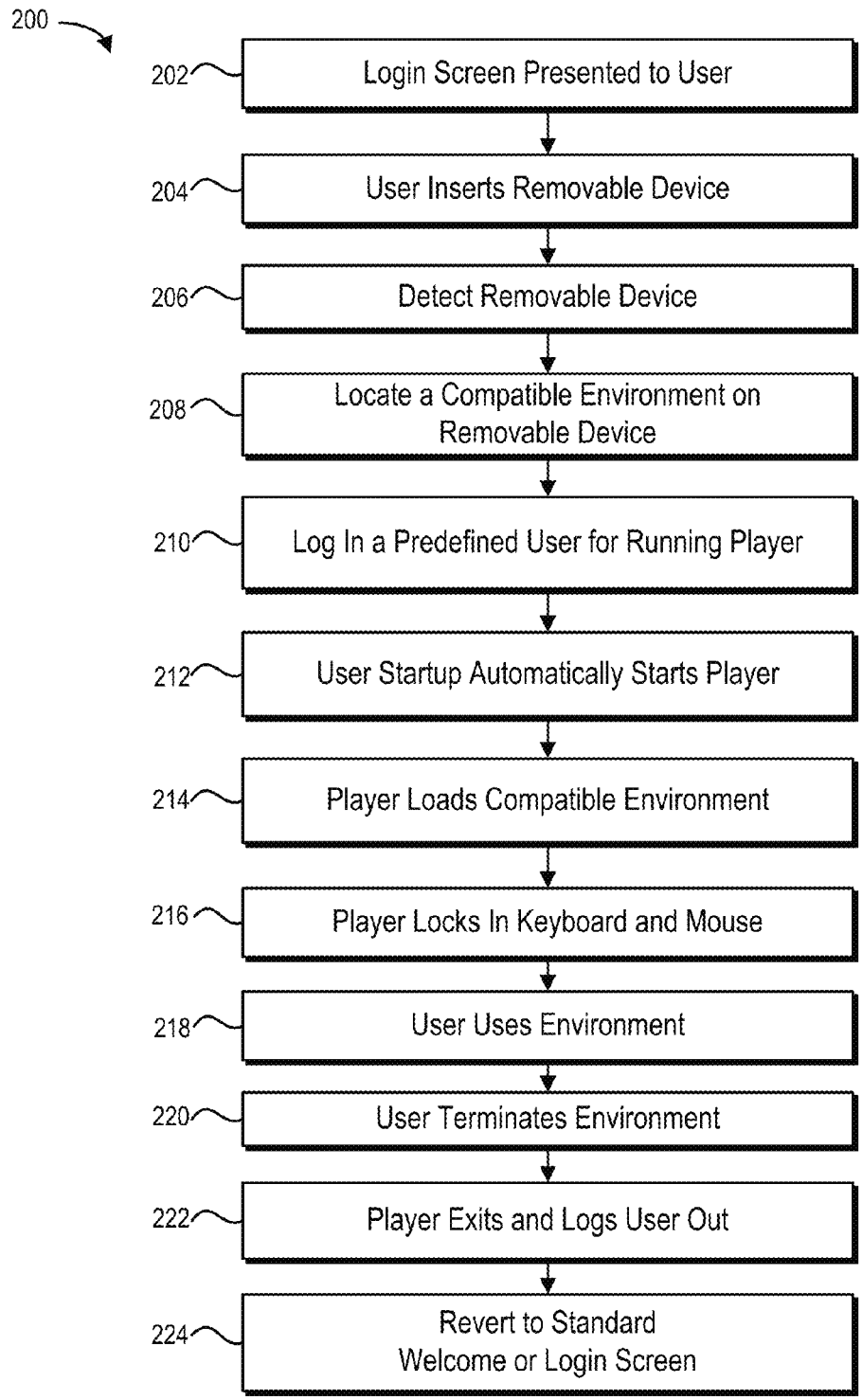
FIG. 2 is a flow diagram showing an example of a process for loading an alternate computing environment onto a host device after a session manager has been installed.

FIG. 2 is a flow diagram showing an example of a process 200 for loading an alternate computing environment onto a host device after a session manager has been installed. The process 200 begins when a login screen is presented to a user (202). In some implementations, the user can enter user criteria in the login screen to begin using the host device. In some implementations, the user can insert a removable device (e.g., a USB flash drive) to begin using an alternate environment (204). For example, the alternative environment may be a preconfigured alternate environment located on the removable device. The removable device may contain the user's preferred settings, environment player software operating system information, proprietary software, files, and other user parameters.

In some implementations, the environment player software can be installed on a host device before a removable device is inserted. For example, a user with administrative privileges on the host device may install the player software. In some implementations, environment player software can be included on the removable device and installed upon connection to the host device. In the event that the environment player software is installed on the host device, the removable device can be inserted and a session manager can detect the insertion of the removable device (206). (In some embodiments, the removable device can be wirelessly coupled to the host device. For these embodiments, the terminology "detecting insertion" also covers "detecting a wireless coupling" between the host device and the removable device.)

The session manager can locate a compatible environment on the removable device (208). Upon finding a compatible environment, the session manager may instruct the environment player to launch a particular environment. For example, the session manager can log in a predefined user and begin environment virtualization using the environment player (210). In some implementations, the user startup triggered by removable device insertion can automatically initiate a particular environment player (212). Next, the environment player can load the located compatible environment (214) and can lock in the keyboard and mouse for the environment (216). In some implementations, the keyboard and mouse lock-in may be performed to prevent the user from interacting with other applications that may be present on the host device.

In the event no users are currently logged in, then the session manager can initiate the login of a guest user who may run the environment player. For example, the host device can be instructed to set the path of the shell for a particular user to the path of the environment player, which will be run in lieu of a default shell.

As an operational example, when the user arrives at the host device, the session manager detects the insertion of a removable device and detects the presence of an alternate environment on the removable device. The environmental player software can then play the alternate environment in the environment player on the host device. The user then uses the alternate environment on the host device (218). The user can continue until the user decides to terminate the environment (220), and may do so by closing or exiting the environment player.

In some implementations, a user can indicate completion of the session by exiting the environment, shutting down the environment player, or by removing the removable device. Generally, after indicating session completion, the user is logged out (222) and the session manager reverts to a standard welcome or login screen (224). In some implementations, the virtual environment may automatically exit. For example, if a user performs unauthorized functions or the environment times out, the virtual environment may automatically exit. In some implementations, other rules for automatic exit can be configured by an authorized host device user. In yet other implementations, a locked dialog from a previous user may be returned to the console upon another user's session completion.

In some implementations, the environment player may present the user with an opportunity to continue their session by re-inserting a previously removed device. However, a time limit for resuming sessions may be imposed on the user and/or displayed to the user.

Figure 3:
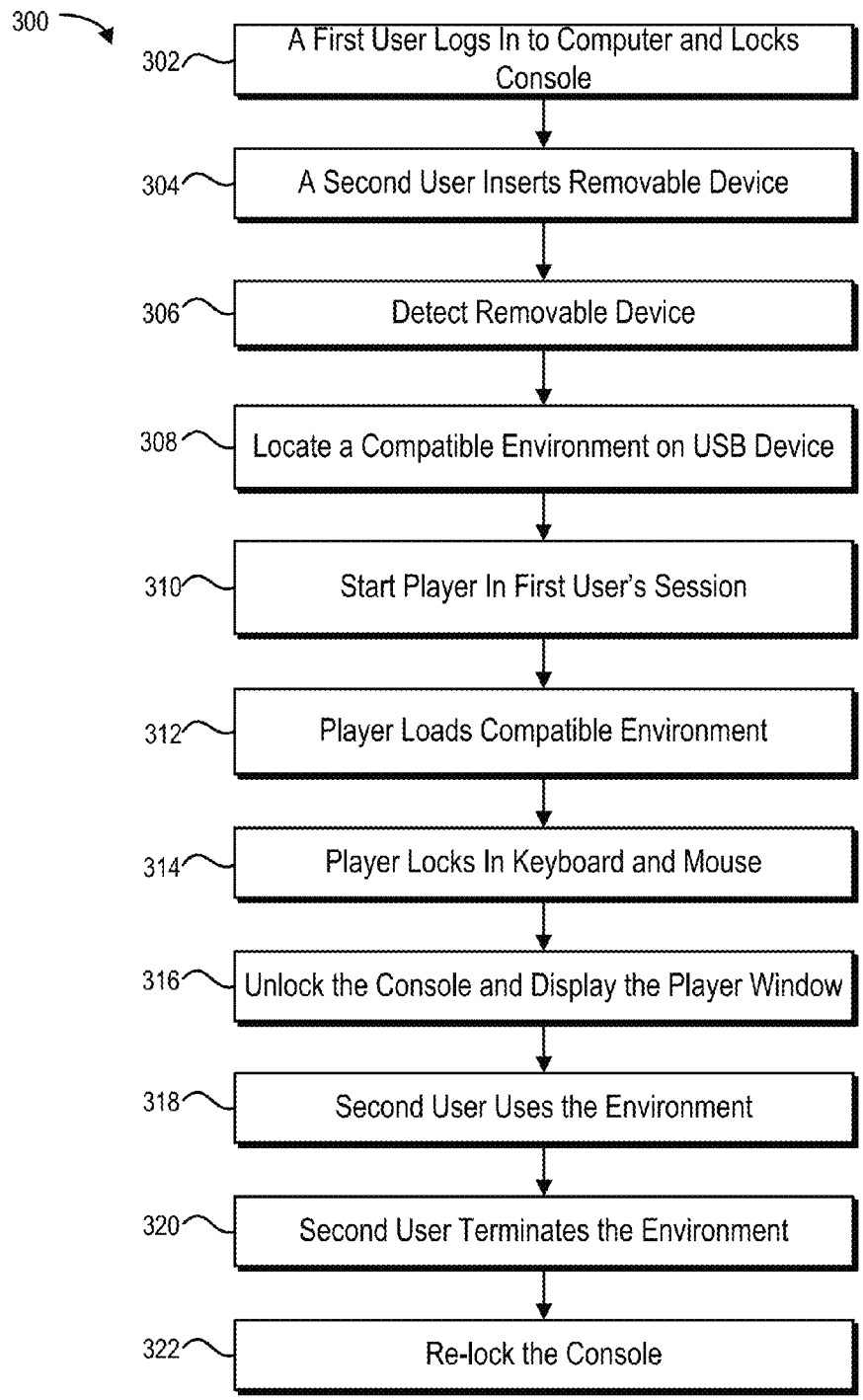
FIG. 3 is a flow diagram showing another example process for loading an alternate computing environment on a host device after a session manager has been installed.

FIG. 3 is a flow diagram showing another example process 300 for loading an alternate computing environment onto a host device after a session manager has been installed. The process 300 begins when a first user logs in to a host device and locks the host device's console (302). Alternatively, the host device console may time out and then lock the first user's console.

Next, a second user inserts a removable device (304) and the session manager detects the device (306). Similar to the above process 200, the session manager can locate a compatible environment on the removable device (308) and can then start the environment player in the first user's session (310). In some implementations, the session manager may create a new session with a new guest user. For example, an additional user can be created and the environment player can be started in that session (e.g., Windows® XP fast user switching).

After locating a compatible environment on the removable device, the environment player can load the environment (312) in the selected console. Generally, the environmental player also locks in the keyboard and mouse for the environment (314).

In some implementations, if the host device has been locked into a screen saver or locked dialog by a user, the session manager may suspend or terminate the dialog or screensaver. Since the first user previously logged in to the console and locked it, the session manager may perform an unlock process on the console and display the environment player window for the second user (316). In this example, the user uses the environment (318) and terminates when completed (320). Upon termination of use by the second user, the session manager may re-lock the console for the first user (322).

Figure 4:
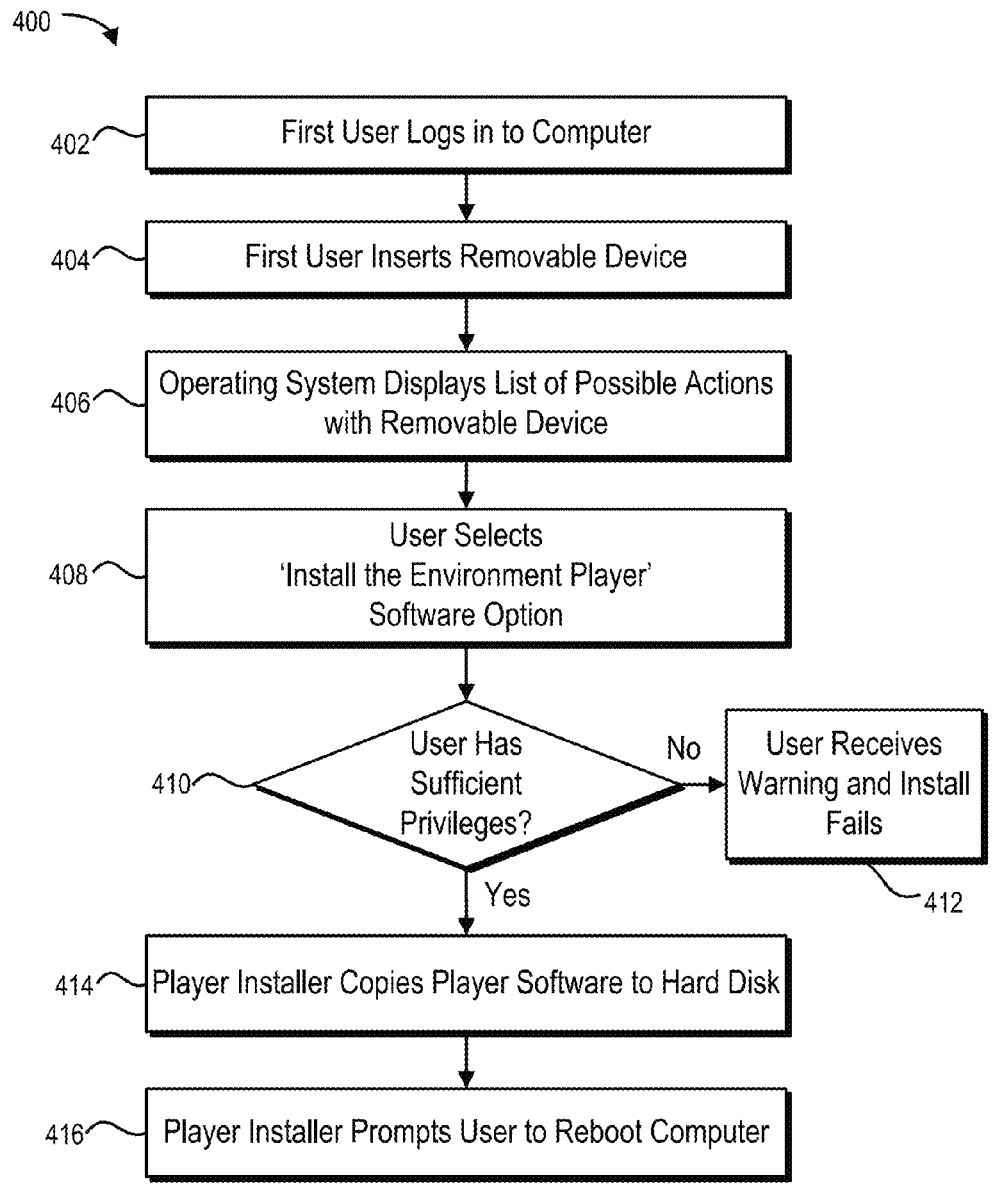
FIG. 4 is a flow diagram showing an example process for loading environment player software onto a host device.

FIG. 4 is a flow diagram showing an example process 400 for loading player software on a host device where a previous environment player software has been uninstalled. In some implementations, the host device may download and install the environment player software from a removable device, or other network source.

The process 400 generally begins when a first user logs in to the host device (402) and inserts a removable device into the host device (404). In some implementations, the operating system on the host device can display a list of possible actions the removable device can initiate (406). One example action may include an "Install the Environment Player" option. In process 400, the user selects the "Install the Environment Player" option from the possible actions (408).

The operating system can determine whether the user has sufficient privileges to install an environment player (410). If sufficient privileges do not exist, then the user may receive a warning pertaining to an attempted and failed install (412). In some implementations, the install may fail and elicit no warning or error.

If the user has sufficient privileges to install environment player software, the player installer, for example, can copy environment player software to the hard disk of the host device (414). After copying the content, the player installer installs the environment player and/or session manager using the copied content, or in some implementations, the install may occur upon completion of the copy. In some implementations, the player installer can prompt the user to reboot the host device to complete installation of the environment player and session manager (416).

Figure 5:
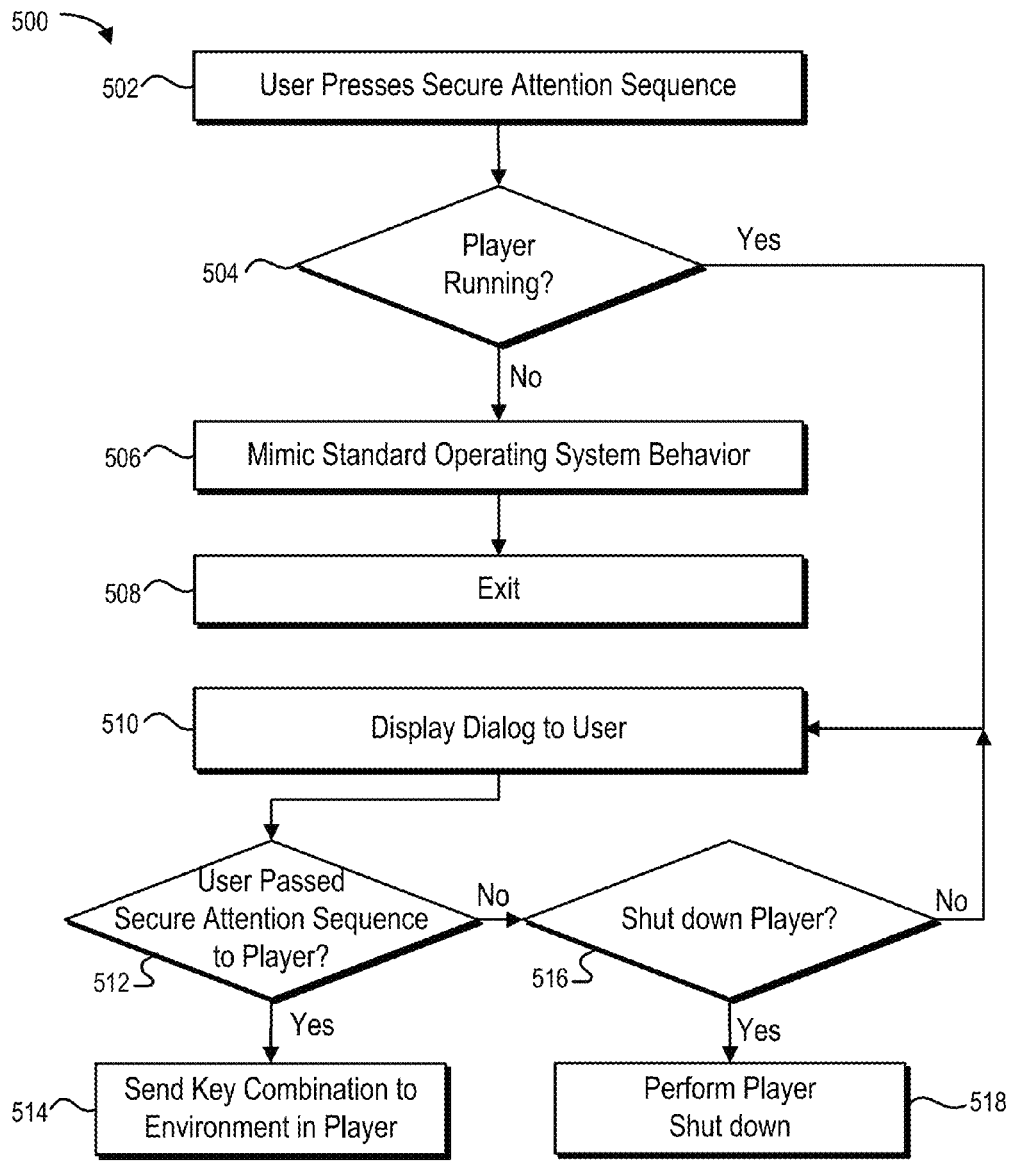
FIG. 5 is a flow diagram showing an example process for activating a secure attention sequence.

FIG. 5 is a flow diagram showing an example process 500 for activating a secure attention sequence. The secure attention sequence represents a key combination to be entered before a login screen is presented. Examples include Control-Alt-Delete for Windows® NT-based systems, Control-Alt-Pause or the SysRq-K sequence for Linux, or Control-X Control-R for AIX. In some implementations, the environment player may have a user-configurable secure attention sequence.

The process 500 begins with a user performing a secure attention sequence (502). The session manager can then determine whether an environment player is running on a host device (504). If the environment player is not running, the session manager can pass the sequence to the operating system to mimic standard operation system behavior (506), e.g., displaying the standard OS secure attention sequence dialog, and then exit when appropriate (508)

If the environment player is running, a choice is presented to the user, e.g., a dialog is displayed to the user (510). In some implementations, the dialog may include an option for passing a secure attention sequence to a particular environment player. If the user chooses to enter and send the secure attention sequence to the player (512), the key combination can be sent to the current active environment (514).

If the user chooses not to send the secure attention sequence, other options can be presented. For example, a shutdown environment player option can be presented to shut down the environment player (516). If the user selects shutdown, the operating system may perform a shutdown of the environment player (518). In the event that the user does not wish to shut down, other options can be selected from the presented dialog.

Figure 6:
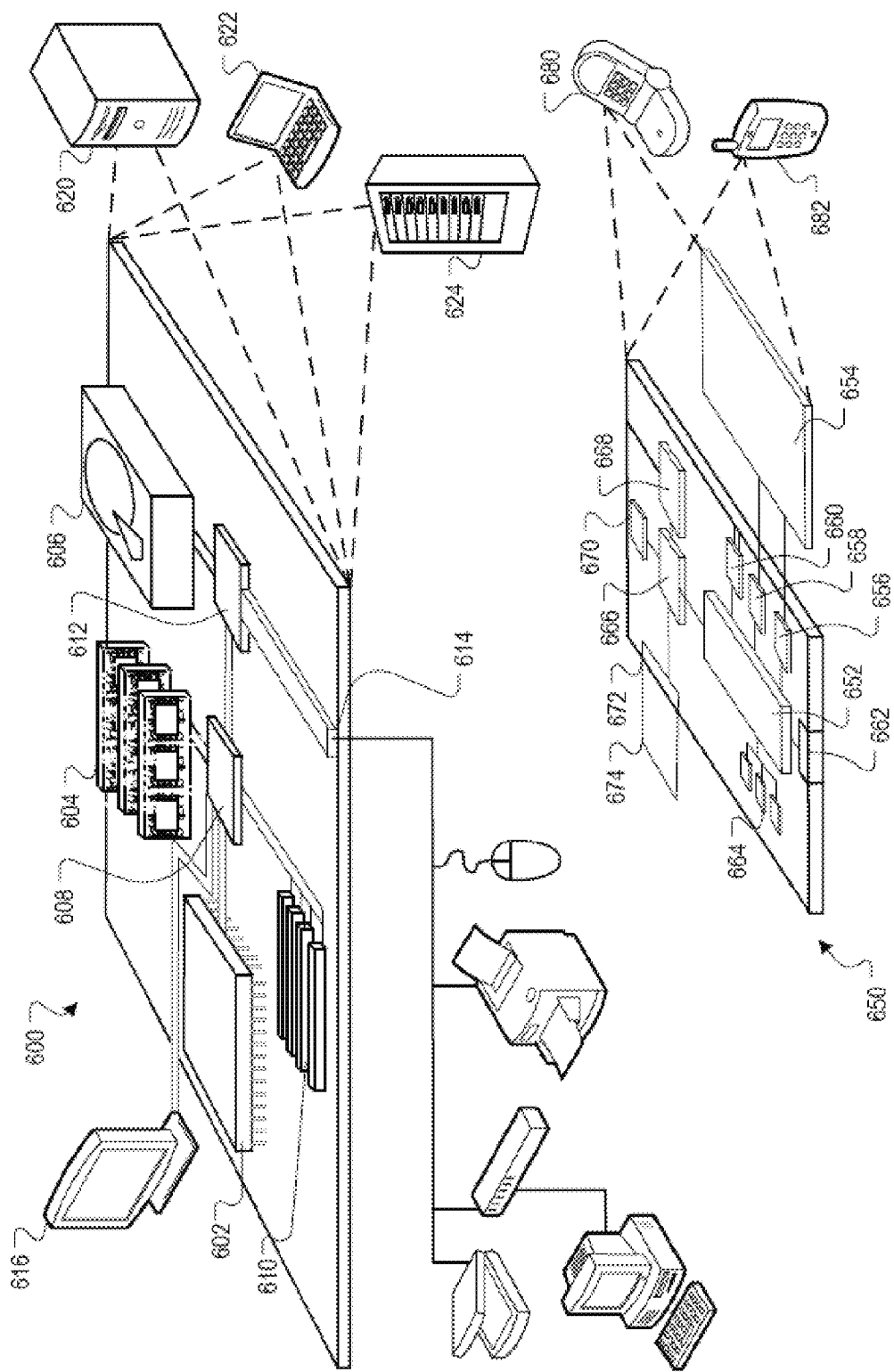
FIG. 6 is a block diagram of computing devices and systems.

FIG. 6 is a block diagram of computing devices 600 and 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612 are interconnected using various buses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet), may be coupled to one or more input/output devices, such as a keyboard, a pointing device, or a scanner, or to a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668 are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may support generally commercially available memory technologies. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the expansion interface, along with additional information, such as placing identifying information on the device in a non-hackable manner.

The memory may include, for example, non-volatile memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codex 660, which may receive spoken information from a user and convert it to usable digital information. Audio codex 660 may likewise generate audible sound for a user, such as through a speaker, e.g., in a handset of device 650. Such sound may include sound from voice telephone calls, recorded sound (e.g., voice messages, music files, etc.) and also sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described herein can be realized in digital electronic circuitry, integrated circuitry, specially designed ASICs (application-specific integrated circuits), computer hardware, firmware, software, and/or combinations thereof. These various implementations can include implementation in one or more computer programs that are executable and/or interpretable on a programmable system, including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, various modifications may be made to the disclosed implementations and still be within the scope of the following claims.

What is claimed is:

1. A computer-implemented method for running an alternate computing environment on a host computing device, comprising:
   detecting the presence of a removable storage device which is in communication with an interface of the host computing device; and
   in response to detecting the presence of the removable storage device,
      automatically locating code which implements the alternate computing environment on the removable storage device, and
      automatically running the code which implements the alternate computing environment on an environment player on the host computing device, wherein the environment player prevents a user of the alternate computing environment from interacting directly with a native computing environment of the host computing device, and wherein the environment player runs the alternate computing environment in sandbox which is insulated front the native computing environment so that a user of the alternate computing environment cannot corrupt the native computing environment.

2. The method of claim 1, wherein preventing the user of the alternate computing environment from interacting directly with the native computing environment involves one or more of:
- preventing the user from accessing most applications in the native computing environment;
- preventing the user from accessing files in the native computing environment; and
- preventing the user from accessing another user's account in the native computing environment.

3. The method of claim 1, wherein detecting the presence of the removable storage device involves one of:
- detecting insertion of the removable storage device into the interface during operation of the host computing device; and
- detecting the presence of the removable storage device at the interface during a boot sequence for the host computing device.

4. The method of claim 1, wherein presenting the alternate computing environment involves performing a keyboard and pointing-device lock-in operation, which prevents the user of the alternate computing environment from interacting with other applications and features which are present on the host computing device.

5. The method of claim 1, further comprising allowing the user to interact directly with the native computing environment after the user provides a username and password or some other form of authentication.

6. The method of claim 1, wherein if the removable storage device is associated with an existing account on the host computing device, presently the alternate computing environment involves logging in to the existing account.

7. The method of claim 1, wherein prior to detecting the presence of the removable storage device, the method further comprises having the environment player installed on the host computing device.

8. The method of claim 1, wherein the environment player on the host computing device is implemented as a virtual machine.

9. The method of claim 1, wherein the method is controlled by a system manager component, which allows the method to be performed when the host computing device is in a locked state, wherein during the locked state the host computing device is waiting for a user to log in.

10. A removable storage device that provides an alternate computing environment when coupled to a host computing device, the removable storage device comprising:
- an interface for coupling the removable storage device to the host computing device; and
- a storage medium storing instructions to be executed by the host computing device, wherein the instructions implement the alternate computing environment;
- wherein the instructions are configured to enable the alternate computing environment to execute on an environment player on the host computing device, wherein the environment player automatically executes the alternate computing environment in response to detecting the removable storage device, and prevents a user of the alternate computing environment from interacting directly with a native computing environment of the host computing device, and wherein the environment player runs the alternate computing environment in a sandbox which, is insulated from the native computing environment so that a user of the alternate computing environment cannot corrupt the native computing environment.

11. The removable storage device of claim 10, wherein preventing the user of the alternate computing environment from interacting directly with the native computing environment involves one or more of:
- preventing the user from accessing most applications in the native computing environment;
- preventing the user from accessing files in the native computing environment; and
- preventing the user from accessing another user's account in the native computing environment.

12. The removable storage device of claim 10, wherein executing the alternate computing environment involves performing a keyboard and pointing-device lock-in operation, which prevents the user of the alternate computing environment from interacting with other applications and features which are present on the host computing device.

13. A computing device configured to execute an alternate computing environment from a removable storage device, comprising:
- an interface configured to receive the removable storage device, wherein the removable storage device contains code which implements the alternative computing environment;
- a detection mechanism configured to automatically detect when the removable storage device is in communication with the interface, and in response, to automatically commence execution of the alternate computing environment; and
- an environment player configured to execute the code which implements the alternate computing environment from the removable storage device, wherein the environment player is configured to prevent a user of the alternate computing environment from interacting directly with a native computing environment of the host computing device, and wherein the environment player runs the alternate computing environment in a sandbox which is insulated from the native computing environment so that a user of the alternate computing environment cannot corrupt the native computing environment.

14. The host computing device of claim 13, wherein while preventing the user of the alternate computing environment from interacting directly with the native computing environment, the environment player is configured to do one or more of the following:
- prevent the user from accessing most applications in the native computing environment;
- prevent the user from accessing files in the native computing environment; and
- prevent the user from accessing another user's account in the native computing environment.

15. The host computing device of claim 13, wherein while detecting the removable storage device, the detection mechanism is configured to:
- detect insertion of the removable storage device into the interface during operation of the host computing device; or
- detect the presence of the removable storage device at the interface during a boot sequence for the host computing device.

16. The host computing device of claim 13, wherein executing the alternate computing environment involves performing a keyboard and pointing-device lock-in operation, which prevents the user of the alternate computing environment from interacting with other applications and features which are present on the host computing device.

17. The host computing device of claim 13, wherein the host computing device is configured to allow the user to interact directly with the native computing environment after the user provides a username and password or some other form of authentication.

18. The host computing device of claim 13, wherein if the removable storage device is associated with an existing account on the host computing device, presenting the alternate computing environment involves logging in to the existing account.

19. The host computing device of claim 13, wherein the environment player on the host computing device is implemented as a virtual machine.

20. The host computing device of claim 13, further comprising a system manager component, which is configured to commence execution of the alternate computing environment when the host computing device is in a locked state, wherein during the locked state the host computing device is waiting for a user to log in.

* * * * *